United States Patent
Donaldson et al.

(10) Patent No.: US 10,831,867 B2
(45) Date of Patent: Nov. 10, 2020

(54) MECHANISM AND APPROACH TO LOCK A LICENSE TO A GIVEN LOCALIZATION

(71) Applicant: Honeywell International Inc., Morristown, NJ (US)

(72) Inventors: Stuart Donaldson, Bothell, WA (US); Patrick Brisbine, Sammamish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 1428 days.

(21) Appl. No.: 14/709,091

(22) Filed: May 11, 2015

(65) Prior Publication Data
US 2016/0335417 A1 Nov. 17, 2016

(51) Int. Cl.
*G06F 21/10* (2013.01)

(52) U.S. Cl.
CPC ...... *G06F 21/10* (2013.01); *G06F 2221/0708* (2013.01)

(58) Field of Classification Search
CPC .................. G06F 21/10; G06F 2221/0708
USPC ...................................... 705/50–79
See application file for complete search history.

(56) References Cited

U.S. PATENT DOCUMENTS

| | | | |
|---|---|---|---|
| 7,149,721 B1 * | 12/2006 | Sites | G06F 21/10 705/59 |
| 8,732,841 B2 | 5/2014 | Ronning et al. | |
| 9,147,049 B2 | 9/2015 | Donaldson | |
| 2005/0022025 A1 * | 1/2005 | Hug | G06F 21/10 726/4 |
| 2006/0059561 A1 * | 3/2006 | Ronning | G06F 21/10 726/26 |
| 2006/0106729 A1 | 5/2006 | Roberts, Jr. | |
| 2009/0089881 A1 * | 4/2009 | Indenbom | G06F 21/128 726/26 |
| 2016/0011573 A1 | 1/2016 | Marti et al. | |
| 2016/0246312 A1 * | 8/2016 | Toddy | G05B 15/02 |

FOREIGN PATENT DOCUMENTS

WO 2006135441 12/2006

OTHER PUBLICATIONS

Installing and Updating Origin, downloaded from https://www.originlab.com/doc/User-Guide/Installation-Startup, attached as PDF file. (Year: 2014).*

* cited by examiner

*Primary Examiner* — James D Nigh
*Assistant Examiner* — Margaret M Neubig
(74) *Attorney, Agent, or Firm* — Seager, Tufte & Wickhem LLP

(57) ABSTRACT

An approach and mechanism relative to a license that is forced or locked to a particular localization. Forcing a license of a product to be localized may be effected with an attribute specifying the locale or language of a particular region, area, or country. The lock-to-locale region or area may be set and thus force a use of localization settings, lexicon files and resources of the particular region, area or country. A hash or code may be developed and embedded as a value of an attribute on the lock-to-locale feature. The hash or code on the files installed may be validated by matching it with the hash or code securely stored within the license file to ensure that the localization files for the region or area have not been tampered with or changed.

5 Claims, 2 Drawing Sheets

MECHANISM AND APPROACH TO LOCK A LICENSE TO A GIVEN LOCALIZATION

BACKGROUND

The present disclosure pertains to licenses and particularly to licenses having certain features.

SUMMARY

The disclosure reveals an approach and mechanism relative to a license that is forced or locked to a particular localization. Forcing a license of a product to be localized may be effected with an attribute specifying the locale of a particular region or area. The lock-to-locale region or area may be set and thus force a use of localization settings, lexicon files and resources of the particular region or area. A hash or code may be developed and embedded as a value of an attribute on the lock-to-locale feature. The hash or code on the files installed may be validated by matching it with the hash or code securely stored within the license file to ensure that the localization files for the region or area have not been tampered with or changed.

DESCRIPTION

Figure 1:
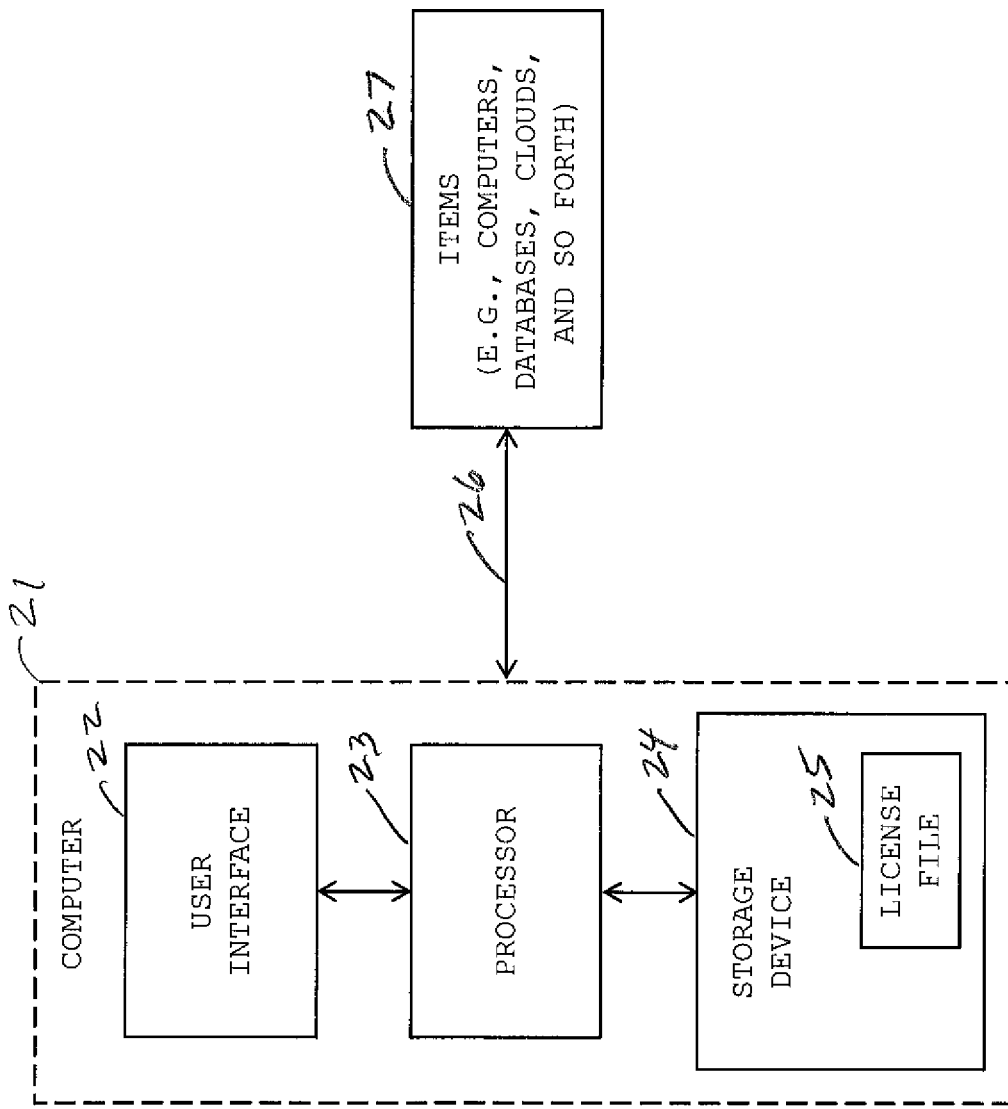
FIG. 1 is a diagram of a system within which incorporates a mechanism and approach for locking a product license.

The present approach and mechanism may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Some approaches may use a license server, as in supporting a floating license, and use the IP address of the client machine to determine if it is in the right locale. An IP address can be spoofed.

The present approach is not necessarily bound by a license server, or node-locked licenses. The present approach may use a hash on localized data in a program to confirm that it is licensed for the correct locale. The present approach can work regardless of the IP address or physical location of the machine that has been licensed. Furthermore, the present approach may be keyed off of the specific localization changes that have been made to the product, and ensure that localization changes for a different locale have not been made.

Some may use a geographic region code, and still are not necessarily tied to the actual localization information as can be taken in the present approach.

A product may need to be forced to a given localization. For example, the Compass™ building control system may be sold in a price sensitive market in China at a lower cost than in the U.S. One may need to ensure that the product sold in China is not palatable to the U.S. market.

By forcing the license of a low-cost Chinese version of Compass to be localized in Chinese, one may ensure that it will not be of value in the general U.S. market.

This may be done by adding a lock-to-locale feature to a Niagara™ license file, with an attribute specifying the locale for China. The product may be checked for whether the lock-to-locale feature is set, and if so it will force a use of Chinese localization settings, lexicon files and resources.

A feature of the present approach or program is that one may also create a hash, such as a SHA256 hash of certain localization strings and lexicon files, and embed that hash as a value of an attribute on the lock-to-locale feature.

An example SHA256 hash may produce a 256-bit (32-byte) value. The SHA (secure hash algorithm) is one of a number of cryptographic hash functions. A cryptographic hash may be like a signature for a text file or a data file. A SHA-256 algorithm may generate an almost-unique, fixed size 256-bit (32-byte) hash. A hash may be a one way function—it cannot necessarily be decrypted back. This makes it suitable for password validation, challenge hash authentication, anti-tamper, digital signatures.

The program may also validate that the hash on the files installed, match the hash in the license file, thus insuring that someone has not taken the Chinese localization files and, for instance, updated them with English words.

This may essentially allow distributing a license that forces a product to be licensed for a given locale, and prevents someone from easily changing the underlying resources to the locale of their choosing.

A check approach may be added to the program to first see if the hardware or software license requires localization locking, and then a check may be added to ensure that the hash of the localization data matches the hash stored securely within the license file.

The example of the present approach may be one of several ways to force the localization information to be locked to Chinese.

FIG. 1 is a diagram of a system that has a computer 21 for the present mechanism and approach. Computer 21 may have a user interface 22 (e.g., display, keyboard, mouse, and so on), a processor 23 connected to interface 22, and a storage device 24 connected to processor 23. Storage device may have a license file 25. License file may contain one or more licenses that may have attributes and other information pertinent to the one or more licenses. Computer 21 may be connected, via a wire and/or wireless medium or media 26, to items 27 such as computers, databases, clouds, and so forth.

Figure 2:
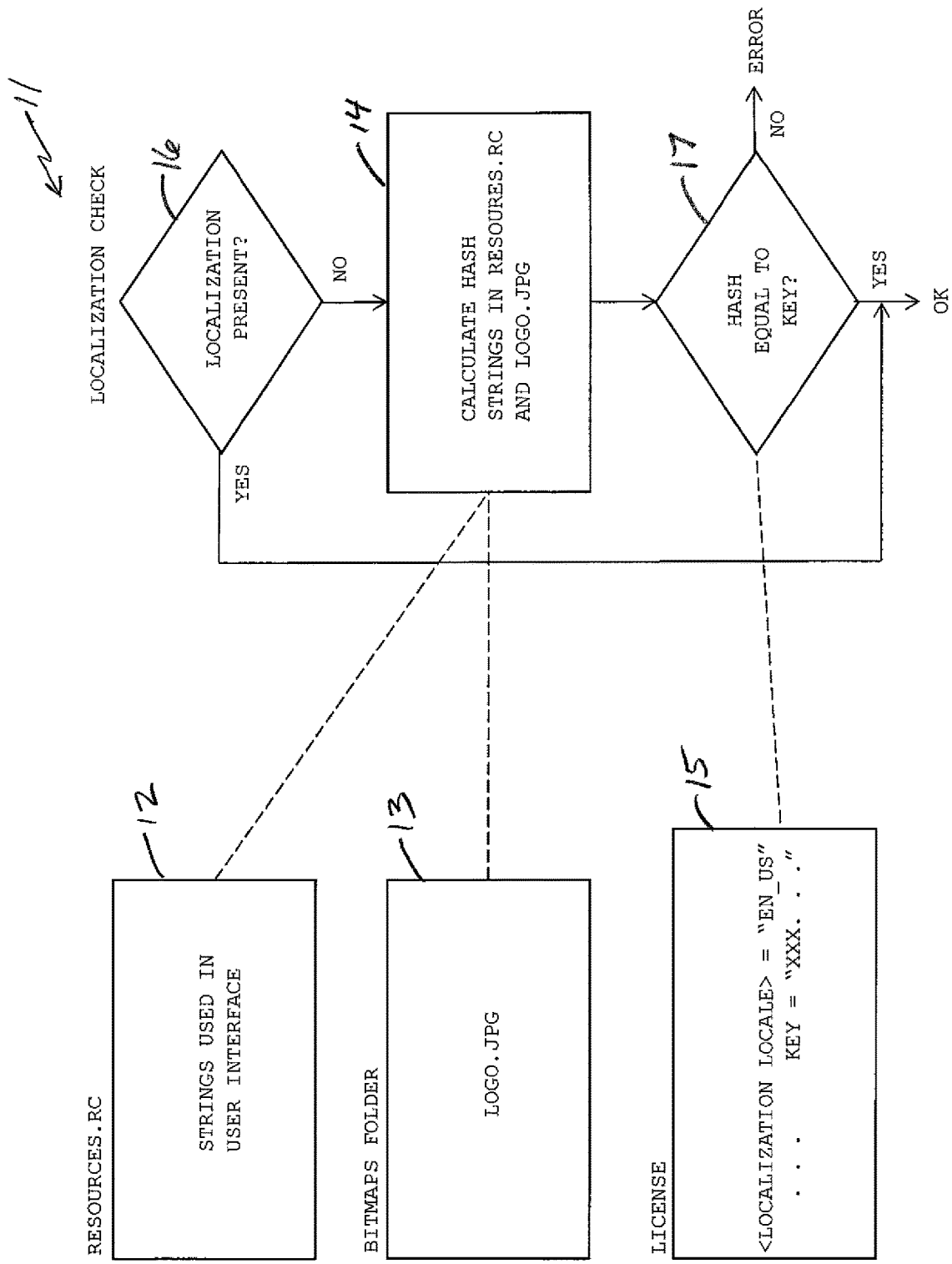
FIG. 2 is a diagram of the mechanism and approach utilized for locking a product license to a given localization.

FIG. 2 is a diagram 11 of the approach and mechanism utilized for locking a product license to a given localization. A resources.RC of a symbol 12 may indicate strings to be used in a user interface provided to a symbol 14. A bitmaps folder as represented by a symbol 13 may provide information relative to logo.jpg to symbol 14 where hash strings of resources.RC and information of logo.jpg may be used in a calculation of hash strings at symbol 14. Information of a license in symbol 15 may be related to <localization locale>="EN_US" and Key="XXX . . . , and may be provided to symbol 17. A localization check at symbol 16 may ask a question whether a localization is present. If an answer is yes, then the conditions for locking a product license to a given localization may be OK. If the answer is no, then hash strings may be calculated from information of resources.RC at symbol 12 and information about logo.jpg of symbol 13, and provided to symbol 17. At symbol 17, a determination of whether the hash from symbol 14 is equal to the key from the license of symbol 15 may be made. If the hash is equal to the key, then the condition for locking a product license to a given localization may be OK. If not, then an output from symbol 17 may indicate an error.

Any publication or patent document noted herein is hereby incorporated by reference to the same extent as if each individual publication or patent document was specifically and individually indicated to be incorporated by reference.

To recap, a mechanism to lock a product license for a localization, may incorporate a processor, a storage device connected to the processor, and a license file situated in the storage device and containing a license for a product. The license may have an attribute for specifying a locale, country, or language of a geographic location. A hash may be used to create a signature of localization strings, and embed a value to an attribute in a lock-to-locale feature. If the attribute is affirmed, then the license may force a use of the geographic localization settings. The hash may be validated by comparison with a stored hash.

The product may be ensured to have a sales value in a country of the locale of the geographic location that is greater than a sales value of the product in another country.

The product may be one or more items selected from a group consisting of hardware and software.

The product may be forced to a given localization.

If the lock-to-locale feature is set, then a use of localization settings, lexicon files and resources for a selected country may be forced.

The hash may be created from localization strings and lexicon files. The hash may be embedded as a value of the attribute in the lock-to-locale feature.

A validation of the hash on the files installed may be obtained by matching the hash with the hash in the license file to ensure that if the localization files have been updated, that they have been updated appropriately.

A distribution of the license may force the product to be licensed for a given locale, and prevent some entity from changing underlying resources to a locale of its own choosing that is contrary to the given locale.

The license file may be a Niagara™ or other based file.

An approach for tying a product license to a specific locale, may incorporate generating a license for a product, storing the license in a file in a memory of a computer, forcing the license for the product to be localized in a particular geographic region, adding a lock-to-locale feature to the file with an attribute specifying a locale for the particular geographic region, and checking whether the lock-to-locale feature is set.

If the lock-to-locale is set, then there may be a forcing a use of localization settings, lexicon files and resources in a language of the locale for the particular geographic region.

The approach may further incorporate developing a hash from the localization strings and lexicon files for the particular geographic region, and embedding the hash as a value of an attribute on the lock-to-locale feature in the file.

The approach may further incorporate validating a hash by matching the hash with a hash in the license file.

Validating the hash may ensure an absence of an unauthorized entity that can alter localization files.

A system of locking a license for a product to a locale, may incorporate a processor having a user interface and a memory, a license file situated in the memory of the processor, a license for a product in the license file, and a mechanism connected to the processor having an attribute for specifying a locale of a geographic location of the product that is a subject of the license in the license file.

The license may force the product to be licensed for a specific locale, language, region, area or country.

The license may prevent an unauthorized entity from changing underlying resources to a locale of its choosing.

A hash may be provided for security of the license of the product.

The hash provided for security of the license of the product may be matched with a hash stored safely within the license file.

A lock-to-locale feature may be added to the license.

If the lock-to-locale feature is set for the product of the license, it may force a localization setting, lexicon files and resources of the locale of the country of the license.

A hash may be created from localization strings and/or lexicon files, and may be embedded as a value of an attribute on the lock-to locale feature.

The program may validate that the hash installed in the files matches a hash in the license to ensure that no one has taken the localization files of the locale of the country for the license.

U.S. patent application Ser. No. 11/839,889, filed Aug. 16, 2007, is hereby incorporated by reference. U.S. Pat. No. 8,484,454, issued Jul. 9, 2013, is hereby incorporated by reference. U.S. patent application Ser. No. 13/603,308, filed Sep. 4, 2012, is hereby incorporated by reference. U.S. patent application Ser. No. 14/327,451, filed Jul. 9, 2014, is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A building control system comprising:
a user interface;
a processor connected to the user interface;
a storage device connected to the processor;
a license file situated in the storage device and containing a license for the building control system, the license specifying a locale, country, or language of a geographic location and having an embedded hash value;
a resource file indicating hash strings to be used in the user interface; and
a bitmaps folder having information relative to a logo file; and
wherein the processor is configured to:
determine whether a localization is present;
lock the license to the specified locale, country, or language of a geographic location when the processor determines the localization is present;
when the processor determines the localization is not present:
calculate a hash string from the hash strings of the resource file and the information relative to the logo file of the bitmaps folder;
compare the calculated hash string to the embedded hash value;
lock the license to the specified locale, country, or language of a geographic location when the calculated hash string is equal to the embedded hash value; and output an error indication when the calculated hash string is not equal to the embedded hash value.

2. The system of claim 1, wherein the building control system is ensured to have a sales value in a country of the locale of the geographic location that is greater than a safes value of the building control system in another country.

3. The system of claim 1, wherein the building control system is one or more items selected from a group consisting of hardware and software.

4. The system of claim 1, wherein the locale, country, or language of a geographic location and the embedded hash value are part of a lock-to-locale feature of the license file.

5. The system of claim 1, wherein a distribution of the license file forces the building control system to be licensed for the locale, country, or language of a geographic location specified in the license, and prevents some entity from changing underlying resources of the building control system to a locale, country, or language of a geographic location of its own choosing that is contrary to the specified locale, country, or language of a geographic location specified in the license.

* * * * *